(12) United States Patent
Breme

(10) Patent No.: US 8,784,160 B2
(45) Date of Patent: Jul. 22, 2014

(54) METHOD FOR MANUFACTURING SPECTACLE LENSES ACCORDING TO A PRESCRIPTION

(75) Inventor: Frank Breme, Hausen am Albis (CH)

(73) Assignee: Satisloh AG, Baar (CH)

( * ) Notice: Subject to any disclaimer, the term of this patent is extended or adjusted under 35 U.S.C. 154(b) by 763 days.

(21) Appl. No.: 12/994,971

(22) PCT Filed: Jun. 8, 2009

(86) PCT No.: PCT/EP2009/004091
§ 371 (c)(1),
(2), (4) Date: Nov. 29, 2010

(87) PCT Pub. No.: WO2009/156054
PCT Pub. Date: Dec. 30, 2009

(65) Prior Publication Data
US 2011/0090456 A1 Apr. 21, 2011

(30) Foreign Application Priority Data

Jun. 26, 2008 (EP) .................................... 08011574

(51) Int. Cl.
*B24B 13/00* (2006.01)
(52) U.S. Cl.
USPC .............................................. 451/42; 451/43
(58) Field of Classification Search
USPC .................. 451/44, 43, 256, 255, 42
See application file for complete search history.

(56) References Cited

U.S. PATENT DOCUMENTS

| 3,512,310 | A | 5/1970 | Rudd et al. |
| 5,649,856 | A | 7/1997 | Cook |
| 5,938,381 | A | 8/1999 | Diehl et al. |
| 6,082,298 | A | 7/2000 | Suter |
| 6,558,586 | B1 | 5/2003 | Padiou et al. |
| 6,712,671 | B2 | 3/2004 | Wallendorf et al. |
| 6,761,784 | B1 | 7/2004 | Hage |
| 6,881,445 | B1 | 4/2005 | Arora |
| 7,066,794 | B2 | 6/2006 | Granziera et al. |
| 7,278,908 | B2 | 10/2007 | Urban et al. |
| 7,419,613 | B2 | 9/2008 | Honda et al. |
| 7,597,033 | B2 | 10/2009 | Savoie et al. |
| 7,748,341 | B2 | 7/2010 | Muster et al. |

(Continued)

FOREIGN PATENT DOCUMENTS

| JP | 2004 157147 A | 6/2004 |
| WO | WO 2009/106296 A1 | 9/2009 |

OTHER PUBLICATIONS

Notice of Opposition from EPO corresponding to European Appln. No. 08011574.4-1262/2138271 including Affidavit of Karen Roberts, Fact Sheet and Invoice dated May 18, 2012, 30 pp.

(Continued)

*Primary Examiner* — Robert Rose
(74) *Attorney, Agent, or Firm* — Reising Ethington P.C.

(57) ABSTRACT

A method for manufacturing spectacle lenses includes the steps of: providing a lets blank having a first face that possesses a final curvature and is coated with an antireflection coating as an outer layer, a second face, and an edge; blocking with a blocking material the lens blank with its first face on a block piece; processing the blocked lens blank on the second face and to obtain a processed lens; deblocking the processed lens from the block piece; and applying on top of the first face antireflection coating of the processed lens a top coating selected from at least one of hydrophobic, oleophobic or dust repelling coatings.

9 Claims, 3 Drawing Sheets

(56) References Cited

U.S. PATENT DOCUMENTS

| | | |
|---|---|---|
| 7,828,624 B2 | 11/2010 | Siders et al. |
| 8,082,756 B2 | 12/2011 | Conte et al. |
| 2003/0049370 A1 | 3/2003 | Lacan et al. |
| 2007/0087119 A1 | 4/2007 | Moravec et al. |
| 2008/0292787 A1 | 11/2008 | Kim et al. |
| 2009/0141236 A1 | 6/2009 | Chen et al. |
| 2010/0136290 A1 | 6/2010 | Biver et al. |
| 2010/0170635 A1 | 7/2010 | Savoie |
| 2011/0033615 A1 | 2/2011 | Breme et al. |

OTHER PUBLICATIONS

An Introduction to the Coating of Ophthalmic Lenses, Satisloh AG, Baar, Switzerland, Jan. 2006, 36 pages.

International Search Report and Written Opinion, International Application No. PCT/EP2009/004091, International Filing Date Aug. 6, 2009, Mailing Date Aug. 31, 2009, 11 pages.

Further Affidavit of Karen Roberts for the Opposition from the EPO including Attachments A3 and A4, 11 pp, Aug. 2013.

Bruneni, Joseph L., AR Plays Catch-Up—Why AR is on the Brink of Leapfrogging into High Usage, Eyecare Business, Issued: May 1, 2003, pp. 29-33.

METHOD FOR MANUFACTURING SPECTACLE LENSES ACCORDING TO A PRESCRIPTION

TECHNICAL FIELD OF THE INVENTION

The present invention relates to a method for manufacturing spectacle lenses according to a prescription, as is carried out on a large scale in prescription workshops, that is to say production workshops for manufacturing individual spectacle lenses from customary materials, for example mineral glass, polycarbonate, PMMA, CR 39, or HI index.

BACKGROUND OF THE INVENTION AND PRIOR ART

An ophthalmic lens blank generally has a first face with a pre-determined curvature and a second face, opposite the first face on which a desired surface contour is generated by a machining process. The overall process is generally referred to as "lens surfacing" and the overall object is to yield a finished spectacle lens L (shown in section in. FIG. 4) so that the curvature of the first (in this instance convex) face cx and the curvature of the machined second (in this instance concave) face cc cooperate to yield desired optical properties according to the prescription. In addition to this the first and/or second faces cx, cc of the lens L are usually coated (cf. FIG. 5 illustrating in an enlarged view of detail V in FIG. 4 an example for such coating) to provide the finished spectacle lens L with an enhanced ability to resist scratching (by use of a "hard coating" HC), with a low residual reflection and a desired color (by use of an "antireflection coating" AR), and/or with certain surface properties such as hydrophobic, oleophobic and dust repelling properties (by use of a "top coating" TC). Usually also a further machining process takes place (the so-called "edging"), the aim of which is to finish-machine the edge E of the spectacle lens L in such a way that the spectacle lens L may be inserted into a spectacle frame. In all these process steps the spectacle lens (blank) L must reliably be held in any machining machine and coating apparatus respectively.

To this end the prior U.S. patent application Ser. No. 12/919,328 discloses a special block piece for holding the spectacle lens (blank) throughout the above mentioned processing steps. To be more precise, prior to the processing the lens blank with its first face cx is "blocked" with the aid of a blocking material—for instance a UV or visible light (VIS) radiation curable adhesive composition—on a workpiece mounting face portion of this block piece, where it remains throughout the processing until the processed spectacle lens L is "deblocked" again from the block piece. So as to further minimize the production efforts in the prescription workshop it has further been proposed in the U.S. patent application Ser. No. 12/919,328 to fully finish the first, blocking face cx of the lens blank prior to the blocking step, including hard coating HC, antireflection coating AR and, if required, top coating TC.

The hydrophobic and/or oil-repellent anti-stain top coatings TC however most often are made from fluorosilane-type materials that reduce the surface energy so as to prevent the adhesion of greasy stains which are thereby easier to remove. One of the problems associated with such top coating TC is that it may achieve such an efficiency that the adhesion at the interface between the blocking material and the first, blocking face cx of the lens blank is thereby altered. As a result there is a risk that the adhesive connection between the lens blank and the block piece cannot sufficiently withstand the forces that are exerted on the lens blank during the machining thereof. At the worst, the lens blank comes off the block piece and is ruined.

In order to address such problem it has been proposed already (cf. US-A-2003 0049370) to coat onto a lens blank comprising an outer hydrophobic and/or oil-repellent surface coating, a temporary protective layer imparting to the lens blank a surface energy at least equal to 15 mJ/m$^2$ so as to achieve a sufficient adhesion at the interface between a holding pad and the lens blank for holding pads conventionally used in the technical field to hold the lens blank on a block piece during the machining steps.

However with this approach it is difficult already to provide for sufficient adhesion at the interface between the hydrophobic and/or oil-repellent surface coating on the one side and the temporary protective layer on the other side. Once sufficient adhesion has been achieved at this interface it must be ensured that the hydrophobic and/or oil-repellent surface coating is not damaged upon removal of the temporary protective layer after processing the lens. This is exceptionally difficult if both the hydrophobic and/or oil-repellent surface coating and the temporary protective layer consist of an organic material.

What is needed is a method for manufacturing spectacle lenses according to a prescription, that overcomes the drawbacks previously cited and enables in particular spectacle lenses with high optical qualities to be produced more quickly and at lower cost, without the risk that the spectacle lens blank unintentionally comes off the block piece during the processing steps.

SUMMARY OF THE INVENTION

According to the present invention a method for manufacturing spectacle lenses according to a prescription comprises the following steps:
(i) providing a lens blank having a first face, a second face opposite the first face, and an edge between the first face and the second face, the first face possessing a final curvature and being coated with an antireflection coating as an outer layer,
(ii) blocking with the aid of a blocking material the lens blank on a block piece, wherein the first face of the lens blank faces the block piece,
(iii) processing the blocked lens blank on the second face and optionally the edge to obtain a processed lens,
(iv) deblocking the processed lens from the block piece, and
(v) applying on top of the antireflection coating on the first face of the processed lens a top coating selected from a group comprising at least one of hydrophobic, oleophobic or dust repelling coatings.

Thus, (1.) the effects and advantages which are related to the fact that the spectacle lens blank remains on the block piece throughout the whole processing step, and which are described in great detail in the U.S. patent application Ser. No. 12/919,328, in addition to (2.) the effects and advantages also described therein, which are related to the fact that the first face of the lens blank is nearly fully finished prior to the blocking step, i.e. finished except for the top coating that can easily be applied to the first face of the processed lens after the deblocking step, are achieved, without the risk however that—because of a hydrophobic, oleophobic and/or dust repelling top coating on the blocking face of the lens blank—the bond between the lens blank and the blocking material on the block piece cannot sufficiently withstand the forces which are exerted on the lens blank during the processing step. The drawbacks discussed above in connection with the known approach of coating a temporary protective layer onto an outer hydrophobic and/or oil-repellent surface coating of the lens blank before the lens blank is blocked, are also avoided so that the final spectacle lens always has an intact top coating of high quality.

Continuing the concept of the invention, a protection layer may be applied on top of the antireflection coating on the first face of the lens blank in between the above steps (i) and (ii), the protection layer having a surface energy higher than that of the top coating, wherein the protection layer is removed again in between the above steps (iv) and (v) from the antireflection coating on the first face of the processed lens. Such temporary protection layer can advantageously protect the antireflection coating on the first face of the lens blank during the blocking and deblocking steps in particular, and provide for a "standardized" interface for the blocking and deblocking operations that has predetermined and suitably adapted characteristics. As compared to the known approach of coating onto an outer hydrophobic and/or oil-repellent surface coating of the lens blank a temporary protective layer, the removal of the newly proposed (again organic) protection layer does not turn out to be a problem since the last, i.e. outer layer of the known antireflection coatings always is of inorganic nature (e.g. $SiO_2$ on plastic substrates), which facilitates the selective removal of the protection layer from the antireflection coating. On top of it there always is the above step (v) as the last process step, ensuring that the final spectacle lens has a "fresh", undamaged top coating on its first face—in contrast to an outer coating layer resulting from a protective layer removal step.

In principle, the above discussed temporary protection layer may be applied on top of the antireflection coating on the first face of the lens blank by any suitable coating or lacquering technique, e.g. by dip or spin coating or by spraying. However, preference is given to a thermal evaporation process for applying the protection layer on top of the antireflection coating on the first face of the lens blank. Such approach has the advantage that the protection layer can be applied in a step directly following the formation of the antireflection coating on the first face of the lens blank, preferably in one and the same box coater.

As to the removal of the temporary protection layer from the antireflection coating on the first face of the processed lens, different techniques are conceivable as well, mainly depending on the respective protection layer material, as there are solving/dissolving with water (in the case of a water soluble material for the protection layer) or a manual "stripping off" of the protection layer from the antireflection coating for instance. Preferably however the protection layer is removed from the antireflection coating on the first face of the processed lens by plasma-etching, as disclosed in, e.g., document U.S. Pat. No. 7,419,613 B2 for organic material films (protection layer in the present case) formed on a substrate (processed lens in the present case) with an inorganic material film (antireflection coating in the present case) used as a mask.

Finally, the above processing step (iii) may comprise the following substeps: machining of the blocked lens blank to give the second face a macrogeometry (curvature) according to the prescription; fine machining of the blocked lens blank to give the second face the required microgeometry (roughness); cleaning the blocked lens blank that has been machined and fine machined; optionally spin or dip coating of the blocked lens blank in order to provide the second face with a hard coating, or a primer, or a primer and a hard coating, as desired; vacuum coating of the blocked lens blank to provide an antireflection coating and, if required, a top coating such as hydrophobic and/or oleophobic and/or dust repelling coating on the second face; and, again if required, edging of the blocked lens blank to give the edge the desired geometry so that the processed lens is ready for insertion into a spectacle frame or a spectacle holder. As there is no deblocking step in the processing stage, some processing substeps could even be carried out in a—as compared to the conventional time sequence—different sequence where a certain fixed sequence is not necessary from a product point of view, in particular all machining operations including edging could be carried out prior to the coating process(es) if desired or required.

Further effects and advantages of the proposed method for manufacturing spectacle lenses according to a prescription will become apparent to the skilled person from the following description of currently preferred examples of embodiment of the invention.

BRIEF DESCRIPTION OF THE DRAWINGS

Hereinbelow, the invention will be explained in more detail on the basis of preferred examples of embodiment and with reference to the appended, schematic drawings. In the drawings.

DETAILED DESCRIPTION OF PREFERRED EMBODIMENTS OF THE INVENTION

Figure 1:
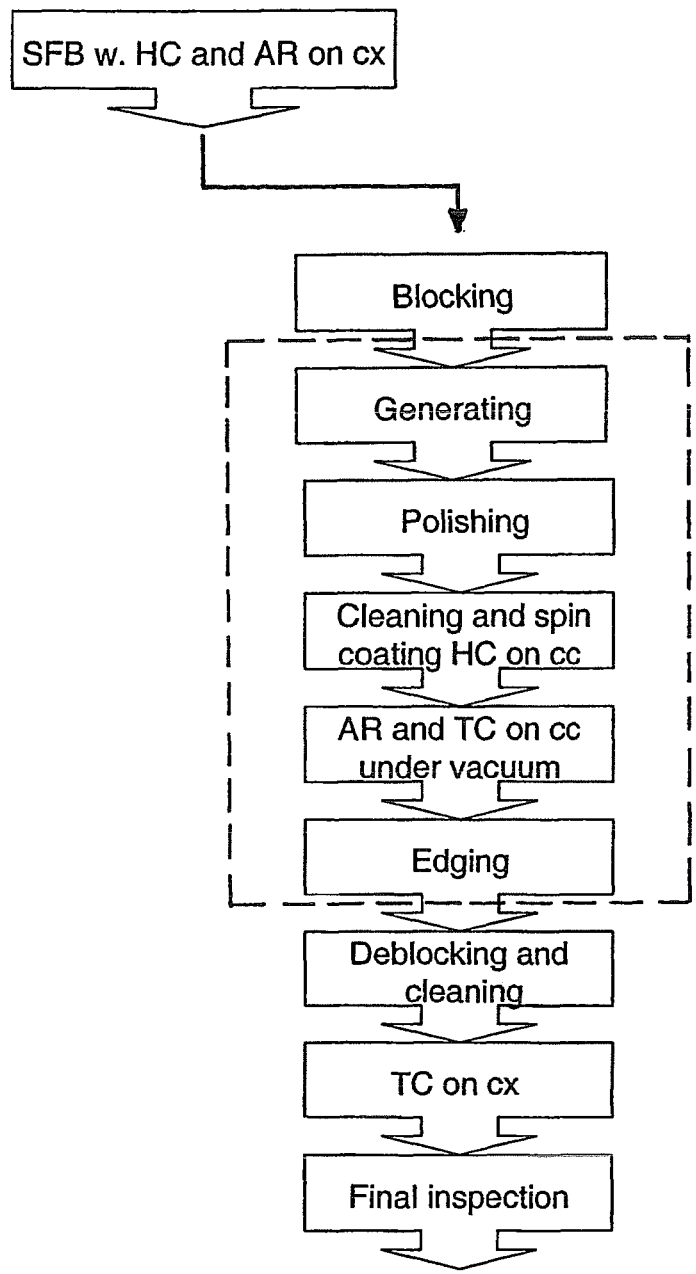
FIG. 1 is a flow chart illustrating among other things the main process steps of a method for manufacturing spectacle lenses according to a prescription in accordance with a first embodiment of the present invention.
Figure 2:
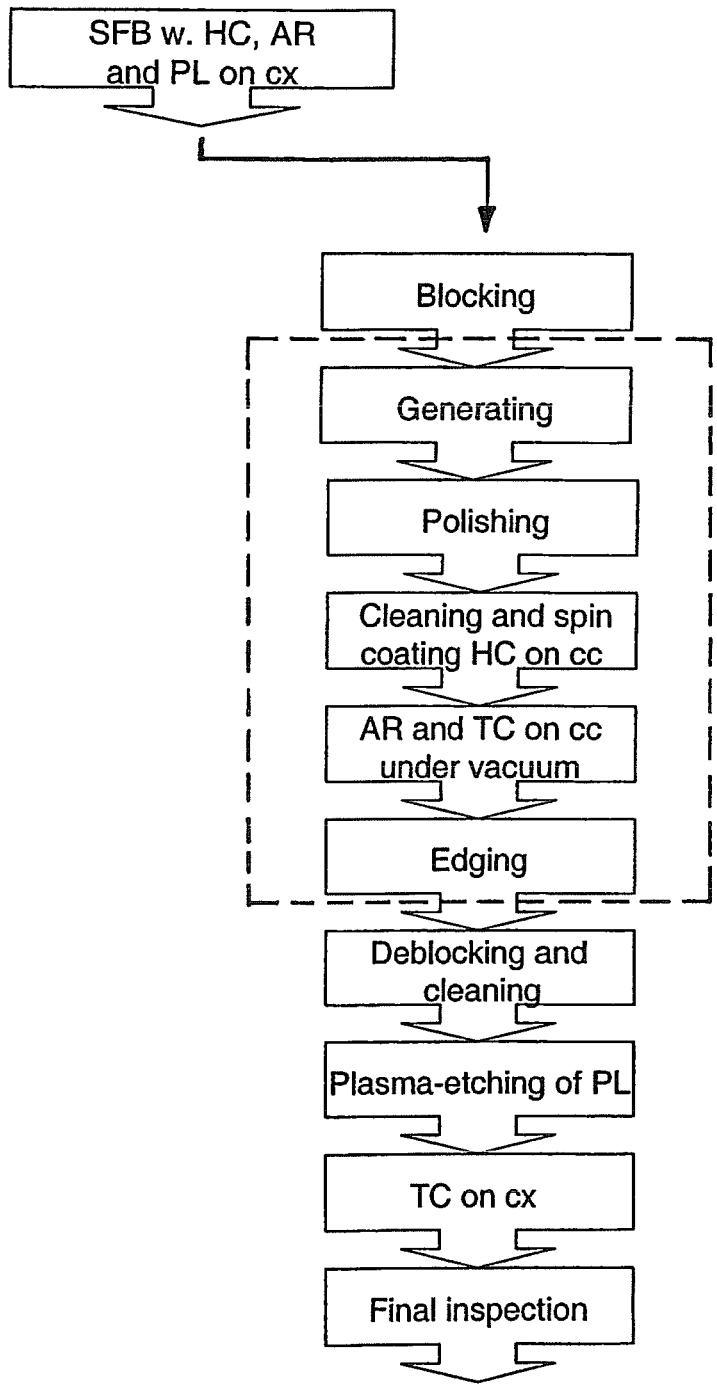
FIG. 2 is a flow chart illustrating among other things the main process steps of a method for manufacturing spectacle lenses according to a prescription in accordance with a second embodiment of the present invention, further comprising substeps concerning the application and removal of a temporary protection layer.

The two examples of embodiment of the method for manufacturing spectacle lenses L according to a prescription, that are illustrated in FIGS. 1 and 2 by way of flow charts, generally have in common the following five main RX process steps:

(i) Initially providing a "semifinished" lens blank SFB having a first face cx, a second face cc opposite the first face cx, and an edge E between the first face cx and the second face cc, the first face cx possessing a final curvature and being coated with a hard coating HC and an antireflection coating AR as an outer layer (that in the case of FIG. 2 is then covered with a temporary protection layer PL prior to blocking).

Figure 3:
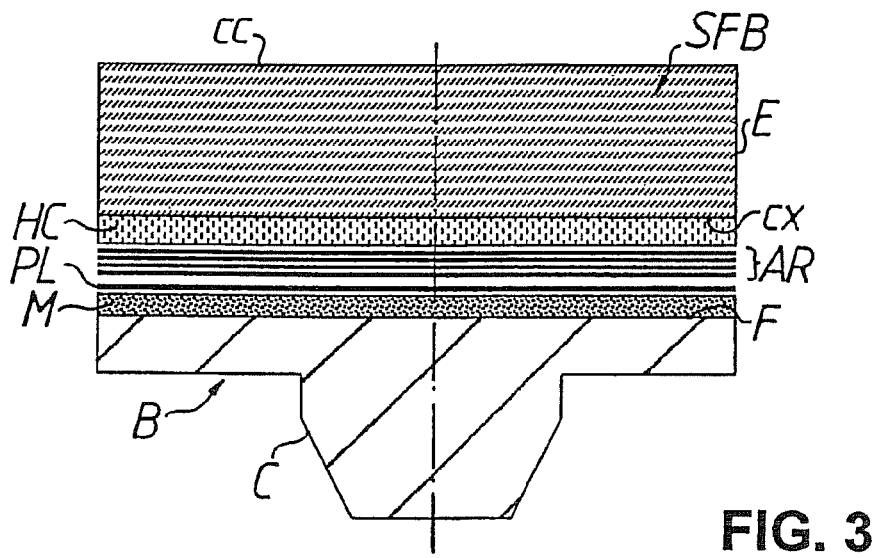
FIG. 3 shows a schematic sectional view of a block piece and of a spectacle lens blank blocked thereon in between the steps of blocking and generating in the method illustrated in FIG. 2, with the temporary protection layer being interposed between the blocking material and the antireflection coating on the first face of the spectacle lens blank.
Figure 4:
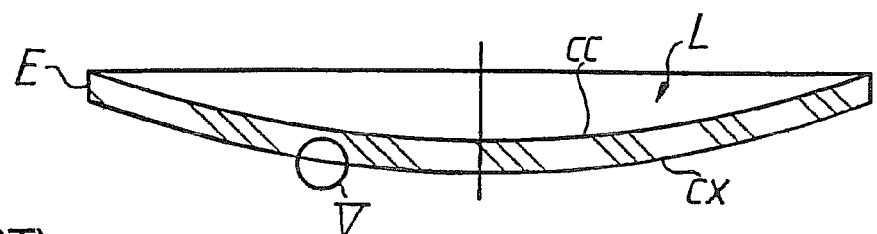
FIG. 4 shows a schematic sectional view of a known spectacle lens.

(ii) Blocking with the aid of a blocking material M the lens blank SFB on a block piece B, wherein the first face cx of the lens blank SFB faces the block piece B (cf. FIG. 3. for the second embodiment)—as to a presently preferred blocking material M and blocking operation, incorporation by reference is hereby made to U.S. Patent Application Publication 2010/0170635 A1 of Satisloh GmbH, whereas incorporation by reference is made to U.S. patent application Ser. No. 12/919,328 of Satisloh GmbH, as far as a preferred block piece B is concerned, that typically has a workpiece mounting face portion F for attachment of the lens blank SFB by means of the blocking material M, and a clamping portion C which is grasped by a chuck or other suitable coupling means during lens processing to provide in particular for secure mounting to the processing equipment while avoiding damage and/or deformation to the lens blank SFB (cf. FIG. 3).

(iii) Processing the blocked lens blank SFB on the second face cc and optionally the edge E to obtain a processed lens (see the rectangles in broken lines in FIGS. 1 and 2).

(iv) Deblocking the processed lens from the block piece B and cleaning it.

(v) Applying on top of the antireflection coating AR on the first face cx of the processed lens (after removal of the temporary protection layer PL in the case of FIG. 2) a top coating TC selected from a group comprising at least one of hydrophobic, oleophobic or dust repelling coatings, as the essential final real processing step prior to the final inspection of the processed lens (and subsequent insertion into/mounting to the spectacle frame).

To be more precise, the processing step (iii) in both cases includes the following substeps (cf. again the rectangles in broken lines in FIGS. 1 and 2):

"Generating", i.e. machining of the blocked spectacle lens blank SFB to give the second face cc a macrogeometry according to the prescription. Such surfacing is carried out using profiling machines which typically have a cutter of some type that is moved across the second face cc of the spectacle lens blank SFB in cutting engagement with the second face cc. The spectacle lens blank SFB may be stationary or rotating during the cutting operation, depending on the particular profiling machine which is being used. Typical machining processes for surfacing spectacle lenses L include single point diamond turning (as the presently preferred fine cutting process for plastic materials and described in, e.g., U.S. Pat. No. 7,597,033 B2 which is hereby incorporated by reference), diamond tool fly-cutting, milling (as the presently preferred rough cutting process for plastic materials and described in, e.g., U.S. Pat. No. 5,938, 381), and grinding processes, applied depending on the lens material.

"Polishing", i.e. fine machining of the blocked spectacle lens blank SFB to give the second face cc the required microgeometry, as described, e.g., in U.S. Pat. No. 7,066,794 B2 and U.S. Pat. No. 7,278,908 B2 which are hereby incorporated by reference. Depending on inter alia the material of the spectacle lenses L, the fine machining process is divided into a fine grinding operation and a subsequent polishing operation, or includes only a polishing operation if a polishable second face cc has already been produced during the generating stage. The polishing step may even be dispensable if a "Cut & Coat"-approach is being utilized, as disclosed in U.S. Patent Application Publication 2010/0136290 A1 or U.S. Pat. No. 6,558,586 B1 which are hereby incorporated by reference.

Cleaning the blocked spectacle lens blank SFB that has been machined and fine machined, and (optionally) spin (or dip) coating of the blocked spectacle lens blank SFB in order to provide the second face cc with a hard coating HC, or a primer, or a primer and a hard coating. A suitable equipment for spin coating is described, e.g., in U.S. Pat. No. 7,748,341 B2 which is hereby incorporated by reference.

Figure 5:
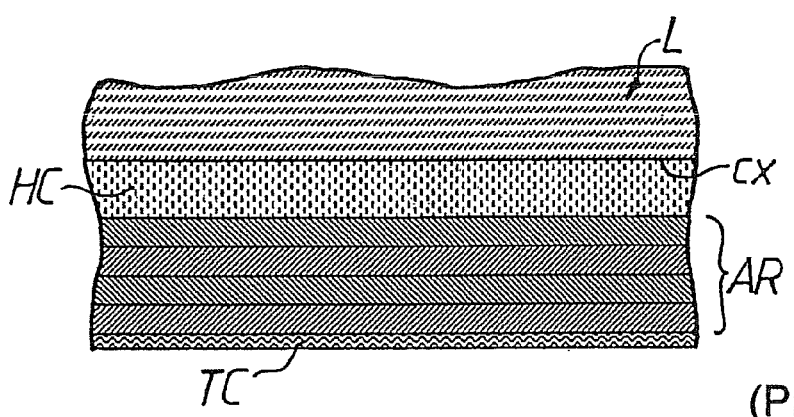
FIG. 5 is an enlarged view of detail V in FIG. 4, illustrating a known example for a coating that may be applied to the convex and/or concave face of the spectacle lens.

Vacuum coating of the blocked spectacle lens blank SFB to provide an antireflection coating AR—normally having four to seven layers made up of two to four materials with different refractive indices, as illustrated in FIG. 5 for the first face cx—and (optionally) a top coating TC (cf. again FIG. 5) for example a hydrophobic and/or oleophobic and/or dust repelling coating on the second face cc. In the vacuum coating step the blocked spectacle lens blank SFB is clamped to a substrate carrier of a rotary carrier device that is located in a vacuum chamber in a vertically spaced relation with respect to an evaporation source for emitting a vapor stream onto the second face cc of the lens blank SFB, as described, e.g., in U.S. Pat. No. 6,082,298 which is hereby incorporated by reference. A suitable "box coater" equipment is available under the trade name "1200-DLF" from Satisloh AG, Switzerland, which as a matter of course is also suitable for applying in the above discussed, subsequent step (v) the top coating TC on top of the antireflection coating AR on the first face cx of the processed lens. Sputtering technologies could also be used for forming the antireflection coating AR and (optionally) the top coating TC, in particular in cases where the coating steps shall be automated in small lot sizes. A suitable sputtering equipment is available under the trade name "SP-200" from the Satisloh AG.

Finally, (and optionally) edging of the blocked spectacle lens blank SFB to give the edge E the geometry required for insertion into a spectacle frame or a spectacle holder. The edging step may also include the forming of bores, grooves, channels and/or bevels corresponding to the respective mounting requirements in the edge area of the spectacle lens L, as described, e.g., in U.S. Pat. No. 6,712,671 B2 which is hereby incorporated by reference.

Since the single processing substeps as well as the equipment and consumables used in those are well known to the person skilled in the art fluffier explanations in this respect actually are not required at this point. Nevertheless, as to possible materials for and the structure of the multilayer coating system on the spectacle lens L (including hard coating HC, antireflection coating AR and top coating TC on either side of the spectacle lens L) as well as the application of such coatings, explicit reference shall be made to the brochure "An Introduction To The Coating Of Ophthalmic Lenses", $2^{nd}$ Edition 2006, available from the present applicant Satisloh AG, Switzerland which is hereby incorporated by reference. In particular, the multilayer coating system may be that available from the present applicant under the trade names "DN1500" or "DN1600" for a dip or spin coatable hard coating HC lacquer, "DP100" for a suitable primer, "Ioncote K+" for a vacuum coatable antireflection coating AR, and "Satin" for a vacuum coatable super hydrophobic and oleophobic top coating TC.

The second example of embodiment illustrated in FIG. 2 differs from the first example of embodiment shown in FIG. 1 in that, in between the above discussed steps (i) and (ii), i.e. prior to blocking, a temporary protection layer PL (see FIG. 3) is applied on top of the antireflection coating AR on the first face cx of the lens blank SFB, that has a surface energy higher than that of the top coating TC (for instance equal to or greater than 15 mJ/m$^2$) and is removed again from the antireflection coating AR on the first face cx of the processed lens in between the above mentioned steps (iv) and (v), i.e. after deblocking but prior to applying the top coating TC on the first face cx. Thus, the temporary protection layer PL serves to protect the antireflection coating AR on the first face cx of the lens blank SFB during the blocking and deblocking steps (ii, iv) in particular, and provides for a "standardized" interface for the blocking and deblocking operations that has predetermined and suitably adapted characteristics, in particular with respect to adhesion.

The temporary protection layer PL may be applied on top of the antireflection coating AR on the first face cx of the lens blank SFB by a thermal evaporation process as that used for the application of the antireflection coating AR on either side of the lens blank SFB. The preferred method for removal of the temporary protection layer PL from the antireflection coating AR on the first face cx of the processed lens is by plasma-etching, as disclosed in U.S. Pat. No. 7,419,613 B2 for instance which is hereby incorporated by reference.

Example with Application and Removal of a Protection Layer

Directly following the application of an "Ioncote K+" antireflection coating AR on the first face cx of a suitably prepared plastic lens blank SFB, a protection layer PL was applied to the cx side antireflection coating AR in the same box coater "1200-DLF" available from Satisloh AG, Switzerland. The coating process as such was carried out as described in great detail in U.S. Pat. No. 6,881,445 B1, which is hereby incorporated by reference in this context. The chemical substance placed in the crucible of the box coater was C16Si(OMe)3 (hexadecyltrimethoxysilane) for the protection layer PL. The layer thickness of the protection layer PL was adjusted to amount to approx. 7 nm.

In the subsequent blocking, processing and deblocking tests the protection layer PL proved to provide for sufficient but not overabundant adhesion at the interface of the cx side antireflection coating AR and the conventional blocking material M.

Following the deblocking step the protection layer PL was removed again from the cx side antireflection coating AR by plasma-etching using an atmospheric plasma. To this end an atmospheric plasma system available under the trade name "Plasmabeam" from Diener electronic GmbH+Co. KG, Germany, was utilized. The etching power was approx. 400 W, and the plasma nozzle was linearly moved with a constant speed of approx. 0.3 m/s at a constant clear distance of approx. 5 mm over the protection layer PL on the processed lens. This procedure was repeated with a lateral distance of approx. 4 mm between adjacent etching "stripes" until the entire first face cx of the processed lens was treated.

This removal step proved to fully remove the protection layer PL from the cx side antireflection coating AR without affecting the latter.

Finally, the plasma treated processed lens was placed in the box coater again where the super hydrophobic and oleophobic top coating TC available under the trade name "Satin" from Satisloh AG, Switzerland, was vacuum coated on the cx side antireflection coating AR, as explained above for the protection layer PL, to obtain a finished spectacle lens L.

In this fashion, a method for manufacturing spectacle lenses is proposed, comprising the steps of: providing a lens blank having a first face that possesses a final curvature and is coated with an antireflection coating as an outer layer, a second face, and an edge; blocking with a blocking material the lens blank with its first face on a block piece; processing the blocked lens blank on the second face and optionally the edge to obtain a processed lens; deblocking the processed lens from the block piece; and applying on top of the first face antireflection coating of the processed lens a top coating selected from at least one of hydrophobic, oleophobic or dust repelling coatings. This method enables spectacle lenses with high optical qualities to be produced quickly and at low cost, without the risk that the spectacle lens blank unintentionally comes off the block piece during the processing steps.

Variations and modifications are possible without departing from the scope and spirit of the present invention as defined by the appended claims.

The invention claimed is:

1. A method for manufacturing spectacle lenses according to a prescription, comprising the steps of:
   (i) providing a lens blank having a first face, a second face opposite said first face, and an edge between said first face and said second face, said first face possessing a final curvature and being coated with an antireflection coating as an outer layer,
   (ii) blocking with the aid of a blocking material the lens blank on a block piece, wherein said first face of the lens blank faces said block piece,
   (iii) processing the blocked lens blank on said second face to obtain a processed lens,
   (iv) deblocking the processed lens from said block piece, and
   (v) applying on top of said antireflection coating on said first face of the processed lens a top coating selected from a group comprising at least one of hydrophobic, oleophobic or dust repelling coatings.

2. The method according to claim 1, wherein in between steps (i) and (ii) a protection layer is applied on top of said antireflection coating on said first face of the lens blank, said protection layer having a surface energy higher than that of said top coating, and wherein said protection layer is removed in between steps (iv) and (v) from said antireflection coating on said first face of the processed lens.

3. The method according to claim 2, wherein said protection layer is applied on top of said antireflection coating on said first face of the lens blank by a thermal evaporation process.

4. The method according to claim 3, wherein said protection layer is removed from said antireflection coating on said first face of the processed lens by plasma-etching.

5. The method according to claim 4, wherein step (iii) comprises the following substeps:
   machining of the blocked lens blank to give said second face a macrogeometry according to the prescription,
   fine machining of the blocked lens blank to give said second face the required microgeometry,
   cleaning the blocked lens blank that has been machined and fine machined,
   vacuum coating of the blocked lens blank to provide an antireflection coating and a top coating including at least one of hydrophobic, oleophobic or dust repelling coating on said second face, and
   edging of the blocked lens blank to give said edge the required geometry so that the processed lens is ready for insertion into a spectacle frame or a spectacle holder.

6. The method according to claim 4 further comprising:
   processing the blocked lens blank on said edge to obtain a processed lens.

7. The method according to claim 5 further comprising:
   spin or dip coating of the blocked lens blank in order to provide said second face with a hard coating, or a primer, or a primer and a hard coating.

8. The method according to claim 1, wherein step (iii) comprises the following substeps:

machining of the blocked lens blank to give said second face a macrogeometry according to the prescription,
fine machining of the blocked lens blank to give said second face the required microgeometry,
cleaning the blocked lens blank that has been machined and fine machined, and
vacuum coating of the blocked lens blank to provide an antireflection coating.

9. The method according to claim 8 further comprising:
spin or dip coating of the blocked lens blank in order to provide said second face with a hard coating, or a primer, or a primer and a hard coating,
providing a top coating comprising at least one of hydrophobic, oleophobic or dust repelling coating on said second face, and
edging of the blocked lens blank to give said edge the required geometry so that the processed lens is ready for insertion into a spectacle frame or a spectacle holder.

* * * * *